(12) United States Patent
Shimazaki (10) Patent No.: US 6,338,143 B1
(45) Date of Patent: Jan. 8, 2002

(54) ELECTRONIC DEVICE

(75) Inventor: Asao Shimazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/287,265

(22) Filed: Apr. 7, 1999

(30) Foreign Application Priority Data

Oct. 19, 1998 (JP) .......................................... 10-297330

(51) Int. Cl.$^7$ .............................................. G06F 1/26
(52) U.S. Cl. ...................................... 713/340; 713/323
(58) Field of Search ................................ 713/310, 323, 713/324, 320, 340

(56) References Cited

U.S. PATENT DOCUMENTS

| | | | |
|---|---|---|---|
| 5,167,024 A | | 11/1992 | Smith et al. |
| 5,854,617 A | * | 12/1998 | Lee et al. .................... 345/102 |
| 6,035,408 A | * | 3/2000 | Huang ........................ 713/320 |
| 6,202,171 B1 | * | 3/2001 | Townsley et al. ............. 714/14 |

OTHER PUBLICATIONS

Japanese Laid–Open Patent Application No. 10–190564, Jul. 21, 1998.
Japanese Laid–Open Patent Application No. 1–260516, Oct. 17, 1989.
Japanese Laid–Open Patent Application No. 2–253320, Oct. 12, 1990.
Japanese Laid–Open Patent Application No. 4–55923, Feb. 24, 1992.
Japanese Laid–Open Patent Application No. 5–241693, Sep. 21, 1993.
Japanese Laid–Open Patent Application No. 10–91291, Apr. 10, 1998.
Japanese Laid–Open Patent Application No. 10–75523, Mar. 17, 1998.
Japanese Laid–Open Patent Application No. 7–302141, Nov. 14, 1995.
Japanese Laid–Open Patent Application No. 7–85107, Mar. 31, 1995.
Japanese Laid–Open Patent Application No. 4–152413, May 26, 1992.
Japanese Laid–Open Patent Application No. 63–75913, Apr. 6, 1988.
Japanese Laid–Open Patent Application No. 59–112320, Jun. 28, 1984.
Japanese Laid–Open Patent Application No. 63–170715, Jul. 14, 1988.

* cited by examiner

*Primary Examiner*—Glenn A. Auve
(74) *Attorney, Agent, or Firm*—Armstrong, Westerman, Hattori, McLeland & Naughton, LLP (57) ABSTRACT

An electronic device includes a power supply circuit selectively providing an external power source or an internal power source, a first part determining whether the external power source is selected, a second part detecting a type of a functional unit used in the electronic device, and a third part which controls to supply the functional unit with electricity from one of the external and internal power sources on the basis of determination results obtained by the first and second parts.

14 Claims, 6 Drawing Sheets

ELECTRONIC DEVICE

BACKGROUND OF THE INVENTION

1. Field of the Invention

The present invention generally relates to electronic devices, and more particularly to an electronic device supplied with driving power from an external power source or a built-in battery which is generally detachable.

Recently, there has been considerable activity in the development of portable electronic devices such as portable information processing devices, for example, portable laptop computers which can be easily carried.

The portable computer is supplied with power from a battery. In order to improve the portability, it is required to miniaturize the battery and reduce consumption power.

2. Description of the Related Art

A conventional electronic device is equipped with a suspend/resume function of supplying power to the minimum parts of the device and breaking a supply of power to the other parts thereof so that power consumption can be reduced.

The suspend/resume function is initiated when a suspend/resume button provided to the body of the electronic device is operated. Then, data in progress is saved and power is supplied to the minimum parts necessary to hold the data thus saved. The other parts of the device are in a paused state, so called, suspended state. When the suspend/resume button is operated in the suspended state, the saved data is restored and the original state immediately prior to the suspended state is retrieved.

The suspended state is initiated at the time of carrying the electronic device, so that a reduced amount of power can be consumed in the device.

Generally, the conventional portable computer is designed to handle a functional unit or a module such as a LAN card or a modem card. A connector connected to a telephone line connected to a telephone network or a LAN line connected to a LAN is connected to a modular jack of the computer. In a place in which the connector is available, commercial power source is also available.

The functional unit such as a modem module of a card type (also referred to as a modem card) or a LAN module of a card type (also referred to as a LAN module) can be driven by the built-in battery without a supply of electricity from an external power source obtained via an AC-DC adapter. Hence, even when a supply of power from the commercial source is available, the user is liable to use the built-in battery rather than the commercial source. In this case, the battery is not charged and the driving capability thereof is reduced because the AC-DC adapter is not connected to the electronic device and a supply of power therefrom does not take place.

Particularly, the LAN module has a comparatively high data transmission rate and thus consumes a large amount of energy. Thus, the driving capability of the battery is greatly reduced.

SUMMARY OF THE INVENTION

It is a general object of the present invention to provide an electronic device in which the above disadvantages are eliminated.

A more specific object of the present invention is to provide an electronic device in which consumption of power of the built-in battery which is generally detachable.

The above objects of the present invention are achieved by an electronic device comprising: a power supply circuit selectively providing an external power source or an internal power source; a first part determining whether the external power source is selected; a second part detecting a type of a functional unit used in the electronic device; and a third part which controls to supply the functional unit with electricity from one of the external and internal power sources on the basis of determination results obtained by the first and second parts.

A further object of the present invention is to provide a method of controlling a supply of electricity to-a functional unit in which the above-mentioned disadvantages are eliminated.

This object of the present invention is achieved by a method of controlling a supply of electricity to a functional module detachably attached to an electronic device, said method comprises the steps of: determining whether an external power source is selected; detecting a type of a functional unit used in the electronic device; a third part which controls to supply the functional unit with electricity from the external power source or an internal power source on the basis of determination results obtained by the first and second parts.

According to the present invention, the electricity can be supplied from the external power source to the functional module of the given type when the external power is available. Hence, when the internal power source is selected, the functional module is not supplied with electricity therefrom. Hence, it is possible to prevent power from being consumed by the functional module when the external power source is not selected. Of course, as will be seen from the following detailed description, the functional module can be supplied with electricity from the internal power source in response to a given instruction.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1:
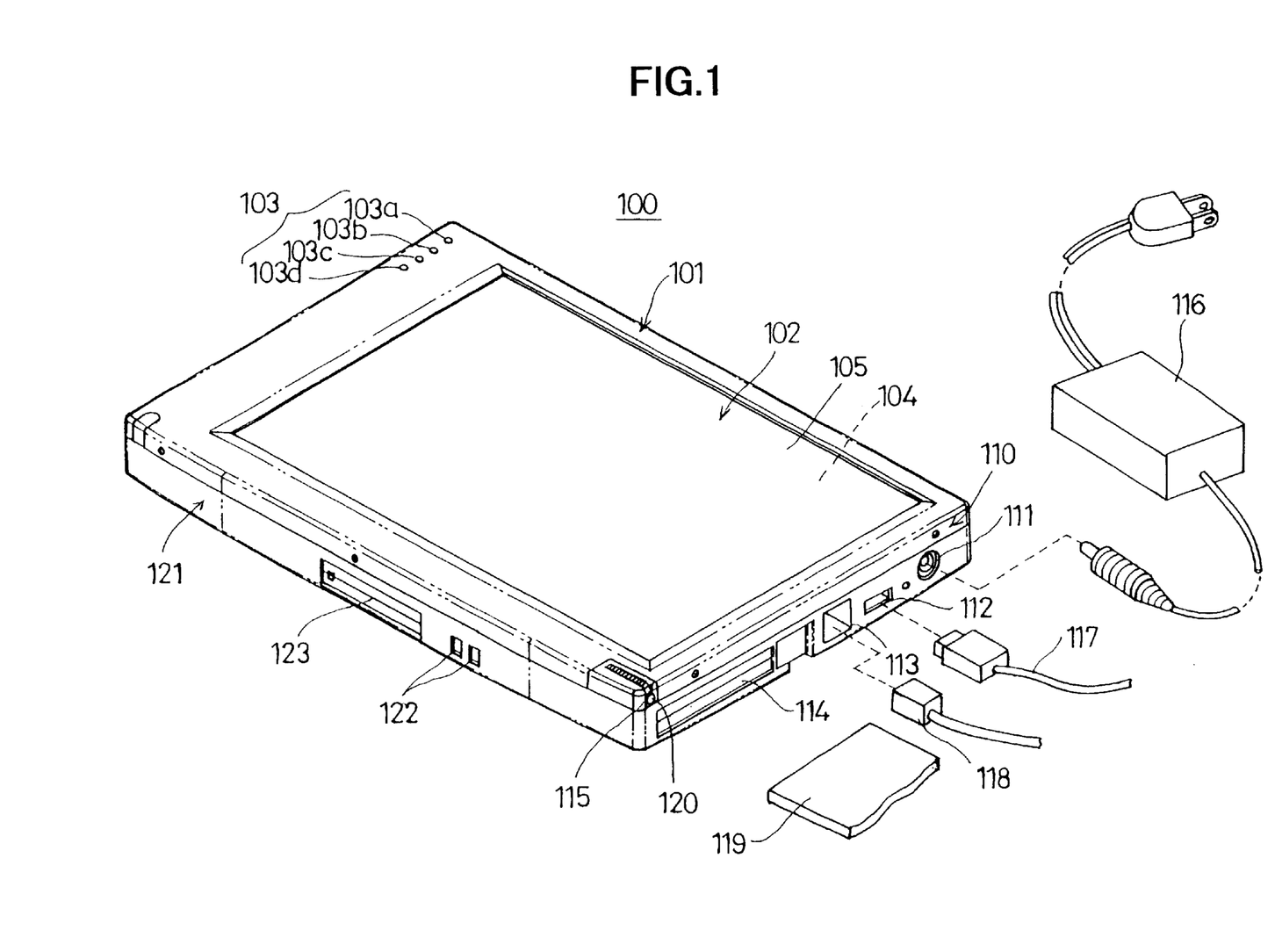
FIG. 1 is a perspective view of a portable electronic device (portable information processing device) according to an embodiment of the present invention.

FIG. 1 is a perspective view of a portable computer which is an electronic device according to an embodiment of the present invention.

An electronic device 100 is a pen-input type personal computer. A display part 102 and a state indication part 103 are provided to a display surface 101 of the electronic device 100. The display part 102 is arranged to the approximately whole display surface 101. The display part 102 includes a liquid crystal display 104 and a touch panel 105. Graphics information such as figures and characters is displayed on the liquid crystal display 104. The touch panel 105 is used to input information.

The state indication part 103 includes a plurality of LEDs 103a–103d, which indicate the respective operation states of the device, for example, the ON/OFF state of an external power source and the ON/OFF state of charging a battery, built in the electronic device 100 in a detachable fashion.

To a right side surface 110 of the electronic device 100, there are provided an AC-DC adapter connection port 111, a USB (Universal Serial Bus) port 112, a communication connector port 113, a PC card slot 114, and a pen inlet port 115. An AC-DC adapter 116 is connected to the AC-DC adapter connection port 111, and an external power source is available via the AC-DC adapter 116.

The USB port 112 is a port which conforms to the USB standards. A USB cable 117 is connected to the USB port 112, so that a peripheral device can be connected to the electronic device 100.

The communication connector port 113 conforms to the RJ11. A connector 118 of telephone line or a LAN line which conforms to the RJ11 can be connected to the communication connector port 113.

The PC card slot 114 conforms to the PCMCIA standard. A PC card 119 which conforms to the PCMCIA standard can be inserted into the PC card slot 114.

A pen 120 can be inserted into and detached from the pen inlet port 115 and is used to operate the touch panel 104.

A DC contact 112 and an expansion connector 113 are provided to a lower surface 121 of the electronic device 100. The DC contact 122 is connected to a DC power source when an expanded device (not shown) is connected to the electronic device 100. The expanded connector 113 is used to receive signals from the expanded device and output signals thereto.

Figure 2:
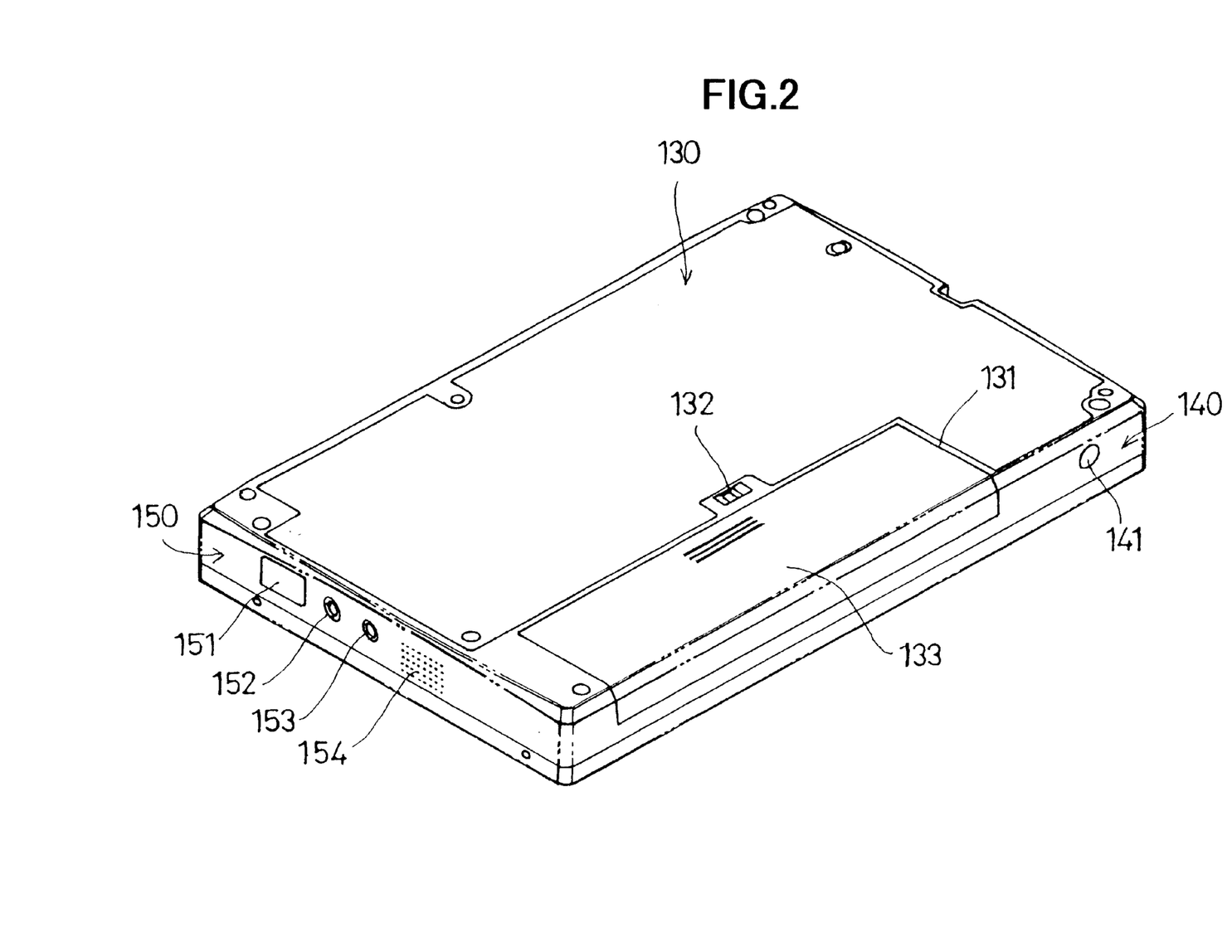
FIG. 2 is a perspective view of a bottom surface of the portable electronic device shown in FIG. 1.

FIG. 2 is a perspective view of the back surface of the electronic device 100. As shown in FIG. 2, a battery pack attaching part 131 and a battery pack lock 132 are provided to a back surface 130 of the electronic device 100.

A battery pack 133 is attached to the battery pack attaching part 131. When the battery pack 133 is attached to the battery pack attaching part 133, the battery lock 132 locks the battery pack 133, which can be detached from the battery pack attaching part 133 by unlocking the battery lock 132.

A suspend/resume button 141 is arranged on an upper surface 140 of the electronic device 100 and is used to indicate a suspend/resume function.

To a left side surface 150 of the electronic device 100, there are provided a IrDA port 151, a microphone jack 152, a headphone jack 153 and a speaker 154. The IrDA port 151 is a communication port which conforms to the IrDA standard. The electronic device 100 can communicate with another device which has an IrDA port conforming to the IrDA standard.

A voice signal can be applied to the microphone jack 153. A voice signal is output from the speaker 154.

Figure 3:
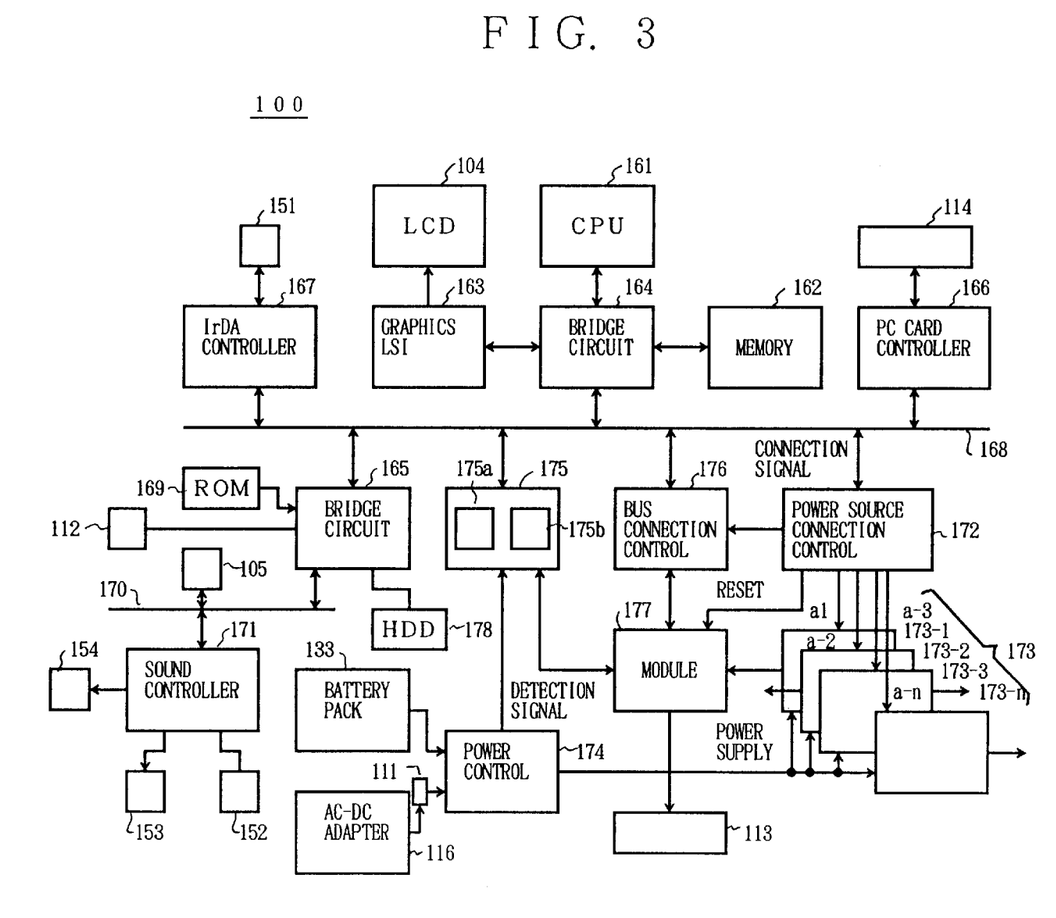
FIG. 3 is a block diagram of the portable electronic device according to the embodiment of the present invention.

A description will now be given of an internal structure of the electronic device 100 with reference to FIG. 3, in which parts that are the same as those shown in FIGS. 1 and 2 are given the same reference numbers.

The electronic device 100 includes a CPU (controller) 161, a memory 162, a graphics LSI 163, bridge circuits 164 and 165, a PC card controller 166, an IrDA controller 167, a PCI bus 168, a ROM 169, and ISA bus 170, a sound controller 171, a power source connection control circuit 172, a power supply control circuit 173, a power supply circuit 174, a state setting circuit 175, a bus connection control part 176, one or a plurality of modules 177 and an HDD (Hard Disk Drive) 178.

The CPU 162 executes a process in accordance with programs stored in the ROM 169 and the HDD 178. The memory 162 is used as a working area of the CPU 161.

The graphics LSI device 163 executes graphics processing. The bridge circuit 164 connects the CPU 161, the memory 162 and the graphics LSI device 163 to the PCI bus 168.

The bridge circuit 165 connects the PCI bus 168 and the ISA bus 170. The sound controller 171 and the touch panel 105 are connected to the ISA bus 170. The microphone jack 152, the headphone jack 153 and the speaker 154 are connected to the sound controller 171, which performs a variety of voice processing.

The USB port 112 is connected to the bridge circuit 165, which makes a connection with a device which conforms to the USB standard.

The power source connection control circuit 172 is connected to the PCI bus 168, and controls the power supply control circuit 173 and the bus connection control part 176 in response to a power on instruction supplied via the PCI bus 168, as will be described later. Further, the circuit 172 controls a set/reset operation on each of the modules 177.

The power supply control circuit 173 includes power supply control circuits 173-1–173-n respectively provided to modules and circuits. The circuits 173-1–173-n are connected to the corresponding modules and circuits, and are turned on or off in response to power supply control signals a-1–a-n from the power source connection control circuit 172. Hence, the modules and the circuits are supplied with electricity or not.

The bus connection control part 176 is connected between the modules 177 and the PCI bus 168, and connects or disconnects the modules 177 to or from the PCI bus 168 in response to a bus connection control signal supplied form the power source connection control circuit 172.

The state setting circuit 175 includes a power source state register 175a and a module register 175b. A flag is set in the power source state register 175a, and indicates whether electricity is supplied from an internal power source of the battery pack 133 or an external power source of the AC-DC adapter 116. A flag is set in the module register 175b, and indicates whether the module 177 connected to the electronic device 100 is a LAN module or a modem module.

At the time of activating the electronic device 100, the power source state register 175a and the module register 175b of the state setting circuit 175 are referred to by the BIOS, and the power source connection control circuit 172 is thus controlled.

Figure 4:
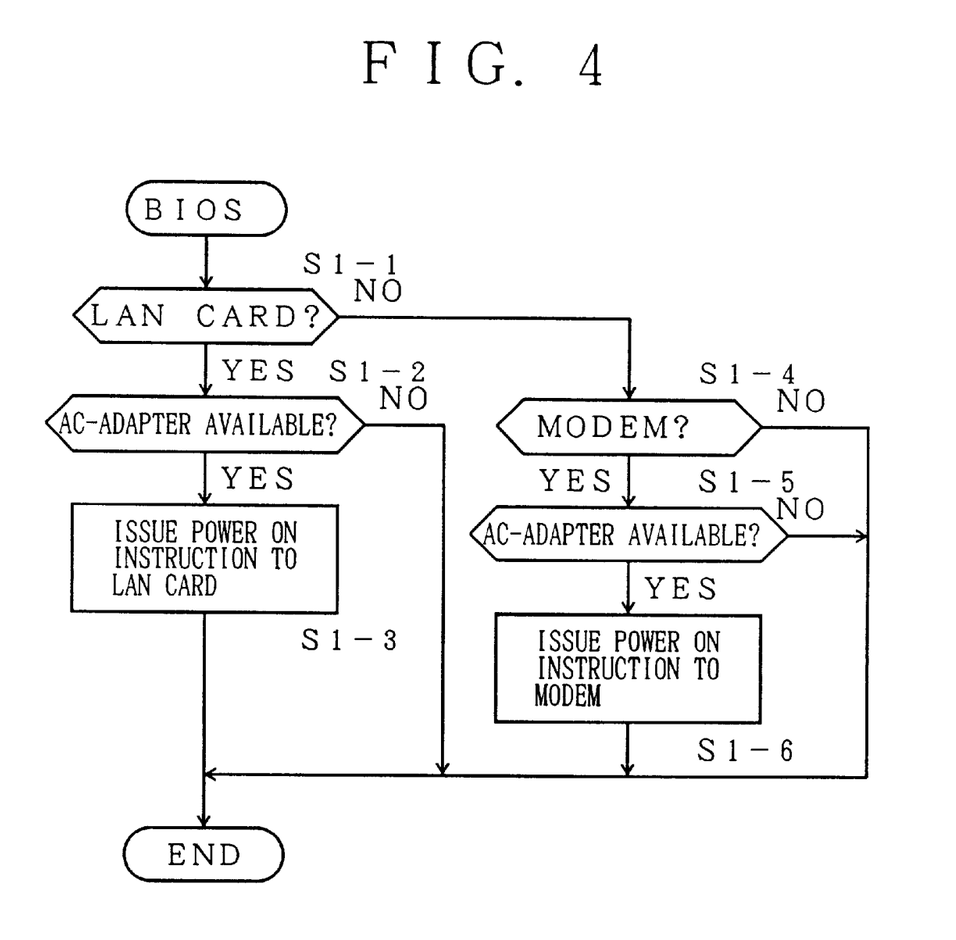
FIG. 4 is a flowchart of a module connecting process performed in the embodiment shown in FIG. 3.

FIG. 4 is a flowchart of a connecting process which is carried out at the time of activating the electronic device 100. A module connecting process is carried out each time the electronic device 100 is activated. That is, the module connecting process is carried out at the time of the power on or the suspend/resume. When the power on or resume is instructed and the activating process is executed, the BIOS or the CPU 161 refers to the module register 175b of the module register 175b and determines whether the connected module 177 is a LAN module (LAN card) or not (step S1-1).

In other words, this step is intended to detect the type of the functional unit attached to the electronic device 100.

If it is determined that the connected module 177 is a LAN module, the CPU 161 refers to the register 175a of the state setting circuit 175, and determines whether the electricity is supplied from the external power source, that is, that from the AC-DC adapter 116 or the internal power source of the battery pack 133 (step S1-2).

When the result of step S1-2 shows that the electricity is supplied from the AC-DC adapter 116, the power on instruction directed to the LAN module is issued to the power source connection control circuit 172 (step S1-3).

When it is determined at step S1-2 that the electricity is supplied from the battery pack 133, the process is ended without issuing the power instruction directed to the module 177.

At step S1-1, the register 175b of the state setting circuit 175 is referred to and it is determined whether the connected module 177 is a modem module or not (step S1-4).

When the result of step S1-4 shows that the connected module 177 is a modem module, the register 175a of the state setting circuit 175 is referred to and it is determined whether the electricity is supplied from the external power source, that is, from the AC-DC adapter 116 or the internal power source from the battery pack 133 (step S1-5).

When it is determined at step S1-5 that the electricity is supplied from the AC-DC adapter 116, the CPU 161 issues the power on instruction directed to the model module to the power source connection control circuit 172 (step S1-6).

When it is determined at step S1-5 that the electricity is supplied from the battery pack 133, the CPU 161 does not issue the power on instruction directed to the module 177 and ends the process.

A description will now be given of a process performed by the power source connection control circuit 172 with reference to FIG. 5.

The power source connection control circuit 172 monitors receipt of the power on instruction directed to the LAN module (step S2-1). When the power on instruction directed to the LAN module is received, the power source connection control circuit 172 turns on the power supply control circuit 173-1 provided to the LAN module (step S2-2). When the power supply control circuit 173-1 is turned on at step S2-2, the LAN module connected as the module 177 is supplied with electricity.

When the power supply control circuit 173-1 provided to the LAN module is turned on at step S2-2 and electricity is started to be supplied thereto, the power source connection control circuit 172 turns on the bus connection control circuit 176 (step S2-3). When the bus connection control circuit 176 is turned on, the module 177 and the PCI bus 178 are connected together.

When the module 177 and the PCI bus 178 are connected at step S2-3, the power source connection control circuit 172 supplies the set signal to the module 177, which is thus switched to the set state (step S2-4).

If the power on instruction received at step S2-1 is not the power on instruction directed to the LAN module, the power source connection control circuit 172 determines that the power on instruction received at step S2-1 is directed to the modem module (step S2-5).

When it is determined at step S2-5 that the power on instruction received is directed to the modem module, the power source connection control circuit 172 turns on the power supply control circuit 173-2 provided to the modem module (step S2-6). When the circuit 173-2 provided to the LAN module is turned on at step S2-6, electricity is supplied to the modem module connected as the module 177.

When the power supply control circuit 173-2 provided to the modem module is turned on at step S2-6 and electricity is supplied thereto, the power source connection control circuit 172 executes step S2-3 at which the module 177 and the PCI bus 178 are connected.

When the module 177 and the PCI bus 178 are connected at step S2-3, the power source connection control circuit 172 supplies the set signal to the module 177 at step S2-4, so that the module 177 is switched to the set state.

Figure 6:
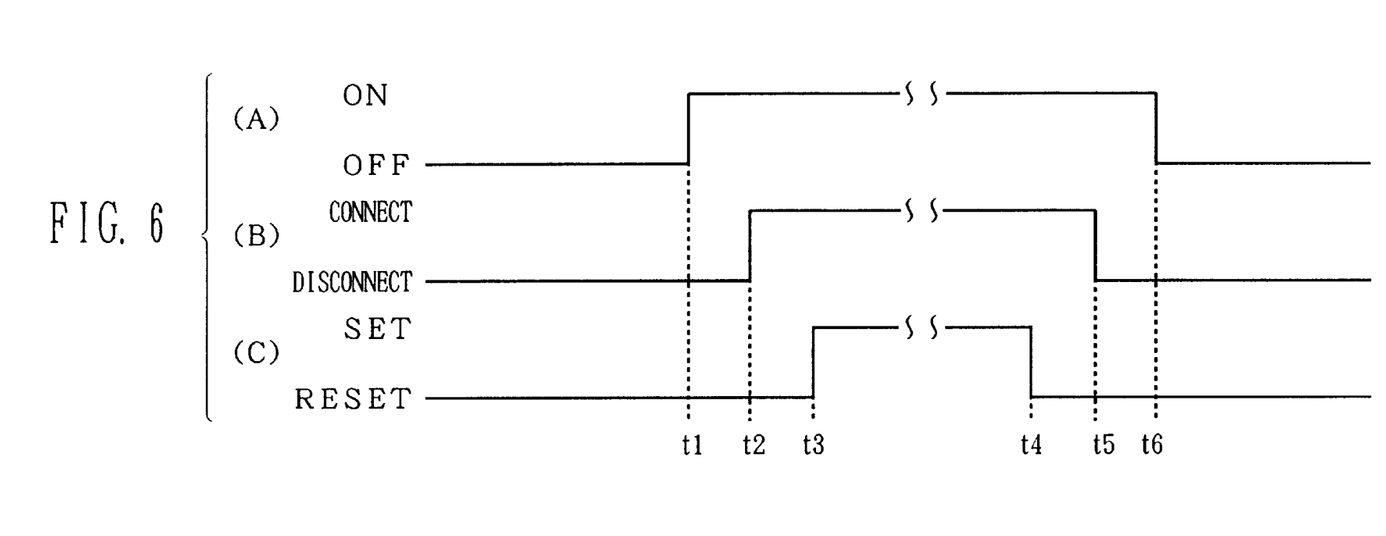
FIG. 6 is a timing chart of an operation performed at the time of activating and deactivating a module.

FIG. 6 is a timing chart of the module connection process carried out in the electronic device 100. More particularly, FIG. 6(A) shows power on to the module, FIG. 6(B) shows the state of the connection between the PCI bus 168 and the module 177 in the bus connection control part 176, and FIG. 6(C) shows the set/reset state of the module 177.

Referring to FIG. 6, when the AC-DC adapter 116 is connected to the AC-DC adapter port 111 and electricity is externally supplied from the AC-DC adapter 116, the power supply circuit 174 detects power on of the external power source. Then, electricity is supplied to the module 177 at time t1 by the processes shown in steps S2-2 and S2-6 shown in FIG. 5.

Figure 5:
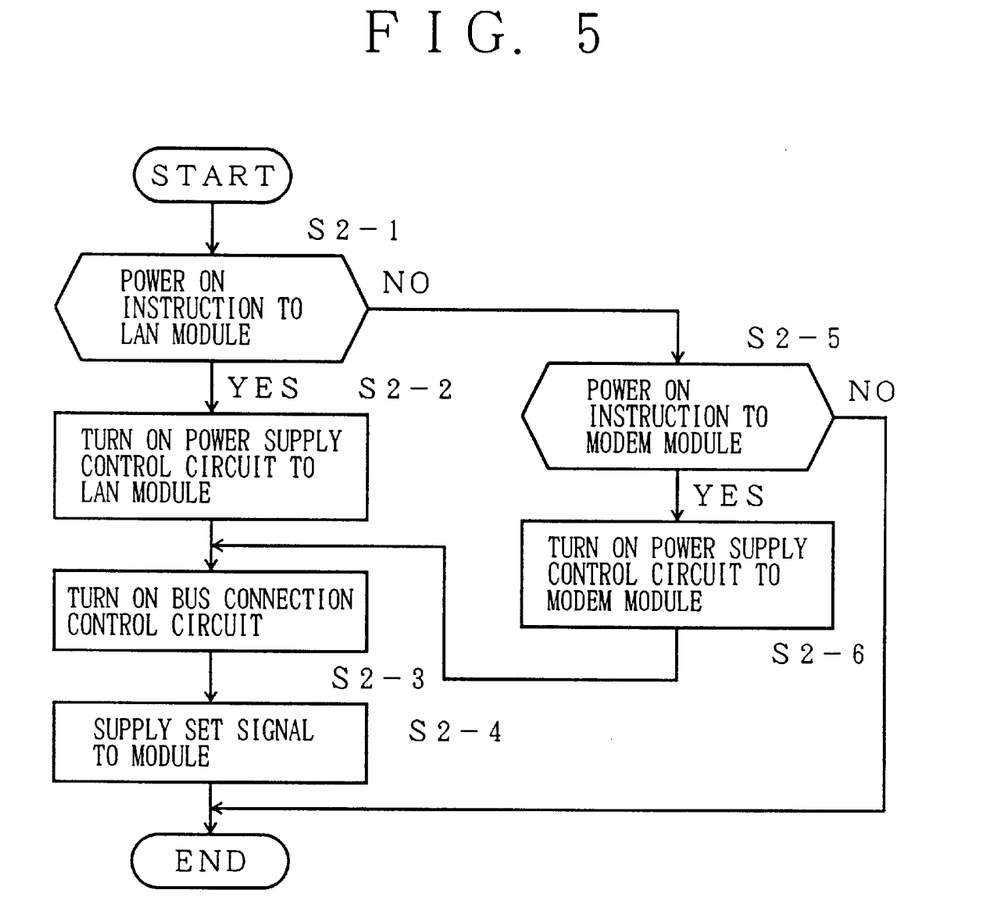
FIG. 5 is a flowchart of a process of a power source connection control circuit used in the embodiment of the present invention.

After electricity is supplied to the module 177 at time t1, the bus connection control part 176 is controlled by step S2-3 shown in FIG. 5, and the module 177 is connected to the PCI bus 168 at time t2.

Thereafter, the reset signal is supplied to the module 177 from the power source connection control circuit 172 by the process of step S2-4. Then, the module 177 is reset at time t3 and becomes operable.

At the time of power off, the module 177 is released from the set state at time t4, and the module 177 is disconnected from the PCI bus 178 by the bus connection control part 176 at time t5. Then, the electricity supplied to the module 177 by the power supply control circuit 172 is stopped.

Hence, it is possible to avoid occurrence of a situation in which the module 177 that is in the set state (operable state) is abruptly connected to the PCI bus 178 and to prevent another operation on the PCI bus 178 from being affected.

According to the embodiment of the present invention described above, a supply of power or electricity to the module 177 is controlled by determining, at the time of activating a given process such as power on or resume, whether electricity is supplied from the battery pack 133 from the external power source via the AC-DC adapter 116. Hence, while the electronic device 100 is being driven, the supply of power to the module 177 is stopped and power consumed in the electronic device 100 can be reduced.

The present invention is not limited to the specifically disclosed embodiment and variations and modifications may be made without departing from the scope of the present invention.

What is claimed is:

1. An electronic device comprising:
   a power supply circuit selectively providing an external power source or an internal power source;
   a first part determining whether the external power source is selected;
   a second part detecting a type of a functional unit used in the electronic device; and
   a third part which controls the supply of electricity to the functional unit from one of the external and internal power sources on the basis of determination results obtained by the first and second parts.

2. The electronic device as claimed in claim 1, wherein the third part controls a supply of electricity to the functional unit so that no electricity is supplied thereto when the type of the functional unit is a given type and the external power source unit is not selected.

3. The electronic device as claimed in claim 1, wherein the third part controls a supply of electricity to the functional unit so as to be supplied from the external power source when the type of the functional unit is a given type and the external power source unit is selected.

4. The electronic device as claimed in claim 1, further comprising a fourth part which starts to supply the electricity from one of the external and internal power sources to the functional unit in response to a given instruction and then connects the functional unit to a bus provided in the electronic device.

5. The electronic device as claimed in claim 4, wherein the fourth part disconnects the functional unit from the bus and then stops supplying the electricity thereto.

6. The electronic device as claimed in claim 4, further comprising a fifth part which is turned on in response to the given instruction so that the electricity from one of the external and internal power sources is allowed to be supplied to the functional unit.

7. The electronic device as claimed in claim 1, wherein a fourth part supplies a set signal to the functional unit after connecting the functional unit to the bus.

8. The electronic device as claimed in claim 1, wherein the second part determines whether the functional unit is a unit for making a connection with a LAN.

9. The electronic device as claimed in claim 1, wherein the second part determines whether the functional unit is a unit for making a connection with a telephone network.

10. The electronic device as claimed in claim 1, wherein the first, second and third parts operate at the time of activating the electronic device.

11. The electronic device as claimed in claim 1, wherein the electronic device is a portable computer.

12. The electronic device as claimed in claim 1, wherein the internal power source is a battery detachably attached to the electronic device.

13. The electronic device as claimed in claim 1, further comprising a liquid crystal display.

14. A method of controlling a supply of electricity to a functional unit detachably attached to an electronic device, said method comprises the steps of:

determining whether an external power source is selected;

detecting a type of a functional unit used in the electronic device;

controlling the supply of electricity to the functional unit from the external power source or an internal power source on the basis of said determination and detection results.

\* \* \* \* \*